US010776743B2

(12) United States Patent
Garrard et al.

(10) Patent No.: US 10,776,743 B2
(45) Date of Patent: *Sep. 15, 2020

(54) TEMPLATE CONTAINERS FOR BUSINESS PROCESS MANAGEMENT

(71) Applicant: International Business Machines Corporation, Armonk, NY (US)

(72) Inventors: Anthony A. Garrard, Bournemouth (GB); David R. H. Kelsey, Waterlooville (GB); Nicolas S. Townsend, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 447 days.

This patent is subject to a terminal disclaimer.

(21) Appl. No.: 15/046,536

(22) Filed: Feb. 18, 2016

(65) Prior Publication Data

US 2016/0224354 A1    Aug. 4, 2016

Related U.S. Application Data

(63) Continuation of application No. 14/612,395, filed on Feb. 3, 2015.

(51) Int. Cl.
*G06F 9/44* (2018.01)
*G06Q 10/06* (2012.01)
(Continued)

(52) U.S. Cl.
CPC ......... *G06Q 10/067* (2013.01); *G06F 3/0484* (2013.01); *G06F 9/451* (2018.02);
(Continued)

(58) Field of Classification Search
CPC ................................. G06Q 10/067; G06Q 10/06316; G06F 9/451; G06F 3/0484; G06F 17/2247; G06F 17/248
(Continued)

(56) References Cited

U.S. PATENT DOCUMENTS 8,302,074 B1   10/2012   Waldorf
8,689,110 B2    4/2014   Verma et al.
(Continued)

OTHER PUBLICATIONS

Anonymous, "Advanced items for Coach Views", IBM Business Process Manager Standard 8.5.0, IBM Knowledge Center, International Business Machines Corporation, 2 pages. http://www-01.ibm.com/support/knowledgecenter/SSFTDH_8.5.0/com.ibm.wbpm.wle.editor.doc/buildcoach/topics/ccontrols.html.
(Continued)

*Primary Examiner* — Tadesse Hailu
*Assistant Examiner* — Darrin Hope
(74) *Attorney, Agent, or Firm* — Nathan M. Rau

(57) ABSTRACT

A method for managing a user interface template container is provided. The method can include creating, in a business process management platform, the user interface template container. The method can include determining whether a container load event is present, the container load event includes calling the user interface template container at run time. The method can also include locating, in response to the container load event, a component element for an original user interface component from the one or more original user interface components in the user interface template container. The method can also include locating, at run time, modification information corresponding to the component element. The method can also include writing, at run time and responsive to the locating the modification information, the modification information into a modified user interface component.

1 Claim, 5 Drawing Sheets

(51) Int. Cl.
*G06F 3/0484* (2013.01)
*G06F 9/451* (2018.01)
*G06F 40/14* (2020.01)
*G06F 40/186* (2020.01)

(52) U.S. Cl.
CPC ............ *G06F 40/14* (2020.01); *G06F 40/186* (2020.01); *G06Q 10/06316* (2013.01)

(58) Field of Classification Search
USPC .......................................................... 715/746
See application file for complete search history.

(56) References Cited

U.S. PATENT DOCUMENTS

| | | | |
|---|---|---|---|
| 2004/0123238 A1* | 6/2004 | Hefetz | G06F 9/451 715/234 |
| 2004/0221261 A1 | 11/2004 | Blevins | |
| 2007/0239726 A1* | 10/2007 | Weiss | G06Q 10/10 |
| 2010/0037150 A1* | 2/2010 | Sawant | G06F 17/30896 715/753 |
| 2010/0058170 A1* | 3/2010 | Demant | G06Q 10/10 715/234 |
| 2010/0313183 A1 | 12/2010 | Ellen et al. | |
| 2016/0012146 A1* | 1/2016 | Benjamin | G06F 16/9577 715/234 |
| 2016/0070813 A1 | 3/2016 | Unter Ecker et al. | |

OTHER PUBLICATIONS

IBM, "IBM InfoSphere Master Data Management V11.4 creates trusted views of your data assets to support operational and analytical initiatives", IBM Europe, Middle East, and Africa Software Announcement ZP14-0552, Oct. 7, 2014, 55 pages. Grace Period Disclosure.

Reynolds et al., "Leveraging the IBM BPM Coach Framework in Your Organization", Redbooks, SG24-8210-00, Apr. 2014, First Edition, 153 pages.

Garrard et al., "Template Containers for Business Process Management", U.S. Appl. No. 14/612,395, filed Feb. 3, 2015.

List of IBM Patents or Patent Applications Treated as Related, Feb. 16, 2016, 2 pages.

* cited by examiner

TEMPLATE CONTAINERS FOR BUSINESS PROCESS MANAGEMENT

STATEMENT REGARDING PRIOR DISCLOSURE BY THE INVENTOR OR A JOINT INVENTOR

The following disclosure is submitted under 35 U.S.C. 102(b)(I)(A): IBM InfoSphere Master Data Management V11.4 creates trusted views of your data assets to support operational and analytics initiatives, IBM, Oct. 7, 2014.

Applicants submit that the aforementioned disclosure is not prior art under AIA 35 U.S.C. 102(a)(1) because it is made by someone who obtained the subject matter from the inventor.

BACKGROUND

The present disclosure relates to data processing, more particular aspects relate to a software program development tool.

Users interact with business processes in various ways, but those interactions can mostly be lumped into a few broad categories: discovering what work needs to be done, performing work, analyzing the work that has been done in the past, and reviewing and managing the work performed by a team.

User interactions with business processes concern work, and Business Process Management (BPM) solution authors may want to design and implement user experiences that can allow a user of the BPM solution to do work efficiently and with as few errors as possible.

Users learn about the work to be performed in various ways. In some cases, users receive notifications via email or Short Messaging Service (SMS). In other cases, users log on to a specific website to view their task list. In either case, it is important for the user to quickly understand the nature of the task and its relative importance to the other tasks that the user is likely responsible for performing. Custom user interfaces may be useful to deliver the information that a user needs to determine the relative importance of a task.

Users perform the work that they are required to do in a number of ways. In some cases, the work is performed outside of the BPM solution using existing systems, and the user simply informs BPM once the work has been completed. In other cases, the user interfaces for performing the work are implemented as part of the BPM solution. In many solutions, both approaches have to be combined.

Custom user interfaces are often useful in providing users with the most relevant information for analyzing process performance. Users analyze the work that has been performed in a number of ways and for a number of reasons. During the execution of a process, real-time feedback is provided to help users guide the subsequent execution of the process. In a similar vein, managers need visibility into the work that their teams are performing, and tools to help them manage that work. Analysis also occurs after-the-fact to determine if the logic of the process allows the business to run smoothly. In each of these cases, the user needs interfaces that supply the business context information that is most relevant for understanding the reality of how well the process is performing.

SUMMARY

According to embodiments of the present disclosure, a method, a system, and a computer program product are provided for managing a user interface template container.

Various embodiments provide for a method for managing a user interface template container. The method can include creating, in a business process management platform, the user interface template container which is linked to one or more original user interface components of a user interface for the business process management platform, and which has modification information that identifies a modification to a component element from a user interface component from the one or more user interface components. The method can include determining whether a container load event is present, the container load event includes calling the user interface template container at run time. The method can also include locating, in response to the container load event, a component element for an original user interface component from the one or more original user interface components in the user interface template container. The method can also include locating, at run time, modification information corresponding to the component element. The method can also include writing, at run time and responsive to the locating the modification information, the modification information into a modified user interface component. The method can also include executing the modified user interface component that is generated from the original user interface component and the modification information.

Various embodiments provide for a system for managing a user interface template container. The system can include a memory. The system can also include a processor device communicatively coupled to the memory. The system can also include a business process management platform communicatively coupled to the memory and the processor device. The business process management platform is configured to create the user interface template container which is linked to one or more user original interface components of a user interface for the business process management platform, and which has modification information that identifies a modification to a component element from an original user interface component from the one or more original user interface components. The business process management platform is configured to determine whether a container load event is present, the container load event includes calling the user interface template container at run time. The business process management platform is configured to locate, in response to the container load event, a component element for an original user interface component from the one or more original user interface components in the user interface template container. The business process management platform is configured to locate, at run time, modification information corresponding to the component element. The business process management platform is configured to write, at run time and responsive to the locating the modification information, the modification information into a modified user interface component. The business process management platform is configured to execute the modified user interface component that is generated from the original user interface component and the modification information.

Various embodiments provide for a computer program product for managing a user interface template container. The computer program product includes a computer readable storage device having a computer readable program stored therein, wherein the computer readable program, when executed on a computing device, causes the computing device to create the user interface template container which is linked to one or more original user interface components of a user interface for the business process management platform, and which has modification information that describes a modification to a component element from an original user interface component from the one or more original user interface components. The computer readable program causes the computing device to determine whether a container load event is present, the container load event includes calling the user interface template container at run time. The computer readable program causes the computing device to locate, in response to the container load event, a component element for an original user interface component from the one or more original user interface components in the user interface template container. The computer readable program causes the computing device to locate, at run time, modification information corresponding to the component element. The computer readable program causes the computing device to write, at run time and responsive to the locating the modification information, the modification information into a modified user interface component. The computer readable program causes the computing device to execute the modified user interface component that is generated from the original user interface component and the modification information.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
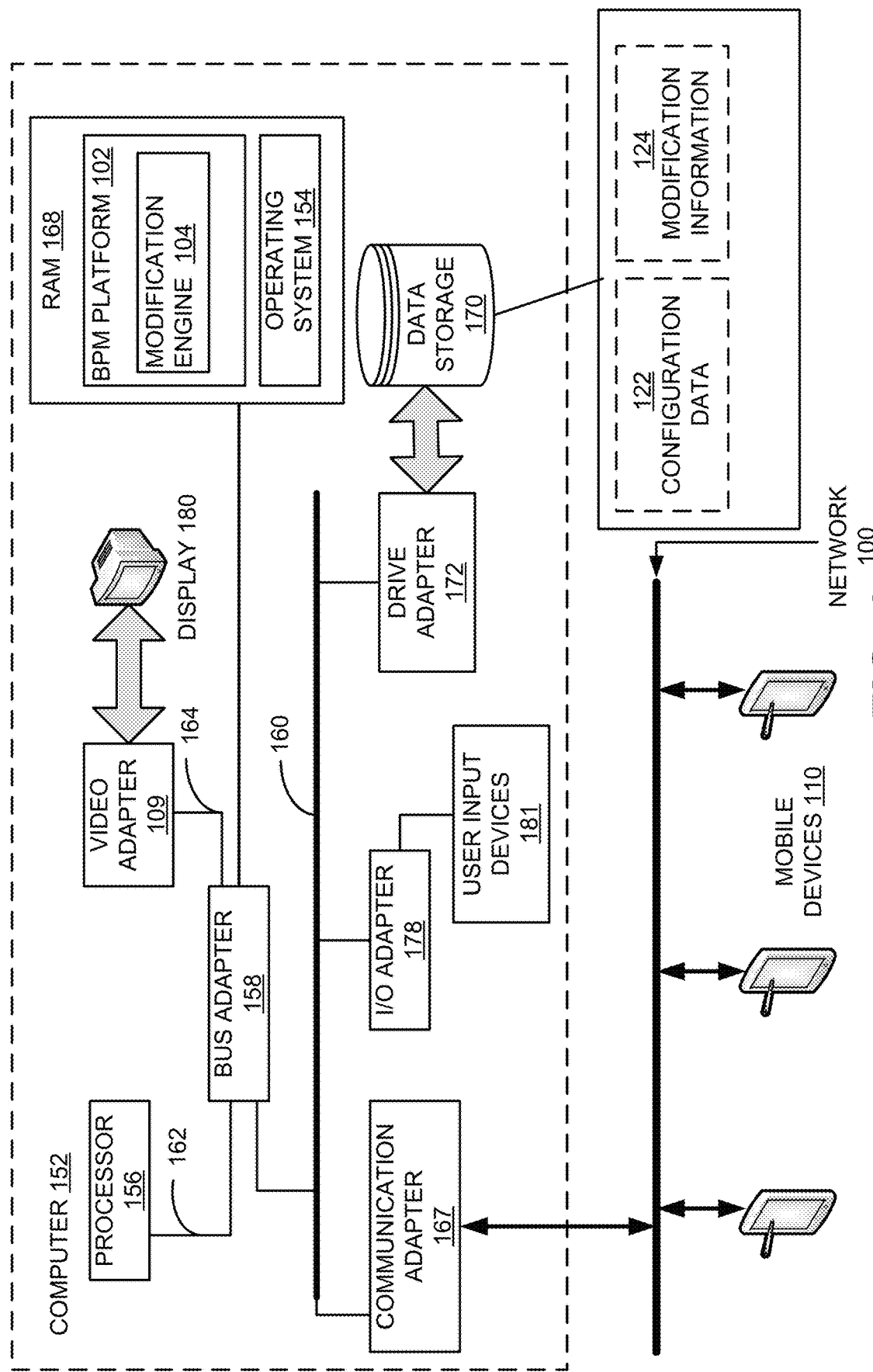
FIG. 1 illustrates a block diagram of automated computing machinery, according to various embodiments.

While the invention is amenable to various modifications and alternative forms, specifics thereof have been shown in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to data processing. More particular aspects relate to a software program development tool. For instance, aspects of the present disclosure relate to a modification to the software program development tool that creates a user interface (UI) template container from a UI component selected by a designer. The software program development tool creates the UI template container that includes both an original user interface component, and modification information for the original UI component. When the UI template container is selected at run time, a system event is triggered where a modification engine in the software program development tool modifies the original UI component in accordance with the modification information, and a user interface executes the modified UI component. While the present disclosure is not necessarily limited to such applications, various aspects of the disclosure may be appreciated through a discussion of various examples using this context.

Maintenance of the user interfaces in a Business Process Management (BPM) framework may be important due to the frequency of changes to the logic of a target organization's business processes. As market conditions change, the logic of the business process may also change and evolve. As the logic of a business process changes, the users' interactions with the business process can also change. The ability to adapt the user interface of a business process with changes to the process logic is proportional to an organization's agility to respond quickly to change.

User interfaces (which may also be referred to as Coaches) make adapting user interfaces when the business process changes. User interfaces that are created with a BPM framework (e.g., IBM® Coach Framework) may be packaged along with the other artifacts that make up a Process Application. When a new version, known as a snapshot, of the Process Application is deployed, all of the user interfaces are also deployed which allows views that are synchronized with the correct process logic.

Aspects of the present disclosure concern dynamically modifying existing BPM UIs in order to extend or alter the UI behavior without having to re-implement the UI from scratch. Self-contained UI components (e.g., IBM® Business Process Manager Coach Views. IBM, the IBM logo, and ibm.com are trademarks or registered trademarks of International Business Machines Corp., registered in many jurisdictions worldwide. Other product and service names might be trademarks of IBM or other companies. A current list of IBM trademarks is available on the Web at "Copyright and trademark information" at www.ibm.com/legal/copytrade.shtml.) include an individual package of HyperText Markup Language (HTML), Javascript® (Javascript and all Javascript-based trademarks and logos are trademarks or registered trademarks of Oracle and/or its affiliates) and Cascading Style Sheets (CSS) with design time configuration data which allows a designer of a UI to tailor the UI components. The UI can be dragged onto a design program to help build an application UI. Various stock controls may be available for use, and allow other packages of UIs to be provided via toolkits which an application can depend on. The stock controls may not contain all the features desired by a designer and may not behave in a predictable manner.

Various BPM solutions may allow for copying a UI component and storing the UI component in the process application. The stored UI component can then be modified. The downside of the storage is that a whole new UI component is created, which means that a designer may not benefit from any bug fixes shipped for the UI component and the resulting application may have a larger file size.

A BPM may allow for the UI components to be shipped for reuse in other process applications via toolkits. The toolkits may lack the capability to extend or modify the UI components without having to copy a UI component out of the toolkit first. The toolkits may lose the ability to easily receive changes to the UI components because a user is effectively creating a new version of the UI component. The changes to the UI components may cause the user to maintain the code for the UI component.

A possible way to extend or modify the UI component would be to take a complete copy of the UI component and store the UI component in a process application to make changes. The downside of this approach is that a whole new UI component is created that a designer of the UI component would maintain the complete set of code for the UI component. Any bug fixes shipped would not necessarily be available and the application larger may be larger as a result.

Various aspects of the present disclosure may relate to creating a BPM UI container which can be dragged via a graphical user interface and, through design time configuration, target one or more UI components and provide information that can augment or replace certain behaviors and looks of the UI component. The UI container may provide the capabilities of a modified UI component without changing the original UI component. The original UI component is generic, which means that it can be used against any BPM with the details of the behavior are altered at design time. In various embodiments, any third party source code for the UI component would not need to be visible to a user of the UI component or the designer. A modification engine can modify how the original UI component is viewed on a browser by altering the UI component's behavior or appearance.

FIG. 1 illustrates a block diagram of automated computing machinery, according to various embodiments. The computing machinery may include example computer 152 useful in performing aspects of the disclosure, according to various embodiments. The computer 152 of FIG. 1 includes at least one computer processor unit 156 or 'CPU' as well as random access memory 168 ('RAM') which is connected through bus adapter 158 to processor 156 and to other components of the computer 152.

The RAM 168 may include a BPM platform 102. The BPM platform 102 is a program suite that manages various business processes. An example of a BPM platform is the IBM® Business Process Manager™. The BPM platform 102 can implement various applications that include one or more UIs with one or more UI components. The BPM platform 102 can includes a modification engine 104. The modification engine 104 is a component of the BPM platform 102 that incorporates modification information into a UI component.

The RAM 168 may include an operating system 154. Operating systems useful for record filtering according to embodiments of the present invention include UNIX® (UNIX is a registered trademark of The Open Group in the United States and other countries), Linux® (Linux is a registered trademark of Linus Torvalds in the United States, other countries, or both), Microsoft XP™ (Microsoft and Windows are trademarks of Microsoft Corporation in the United States, other countries, or both), AIX®, IBM's i5/OS™, and others. The operating system 154 is shown in RAM (168), but many components of such software typically are stored in non-volatile memory also, such as, for example, on a disk drive 170.

The computer 152 may also include disk drive adapter 172 coupled through expansion bus 160 and bus adapter 158 to processor 156 and other components of the computer 152. Disk drive adapter 172 connects non-volatile data storage to the computer 152 in the form of disk drive 170. Disk drive adapters useful in computers include Integrated Drive Electronics ('IDE') adapters, Small Computer System Interface ('SCSI') adapters, and others. Non-volatile computer memory also may be implemented as an optical disk drive, electrically erasable programmable read-only memory (so-called 'EEPROM' or 'Flash' memory), RAM drives, and so on.

The data storage 170 may include one or more storage devices in a tiered or non-tiered configuration. The data storage 170 can include configuration data 122 that describes various user interface components and configuration for the user interface component. The data storage 170 may also include a modification information 124. The modification information 124 is information that concerns how the UI component will be modified. The modification information 124 can be content or configurations of how content in the UI component is modified. The modification information 124 may be used by the modification engine 104, for example.

The example computer 152 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example computer 152 includes a video adapter 109, which is an example of an I/O adapter specially designed for graphic output to a display device 180 such as a display screen or computer monitor. Video adapter 109 is connected to processor 156 through a high speed video bus 164, bus adapter 158, and the front side bus 162, which is also a high speed bus.

The example computer 152 includes a communications adapter 167 for data communications with other computers 110, e.g., mobile devices, and for data communications with a data communications network 100. Such data communications may be carried out serially through RS-232 connections, through external buses such as a Universal Serial Bus ('USB'), through data communications networks such as IP data communications networks, and in other ways that are known to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

Figure 2:
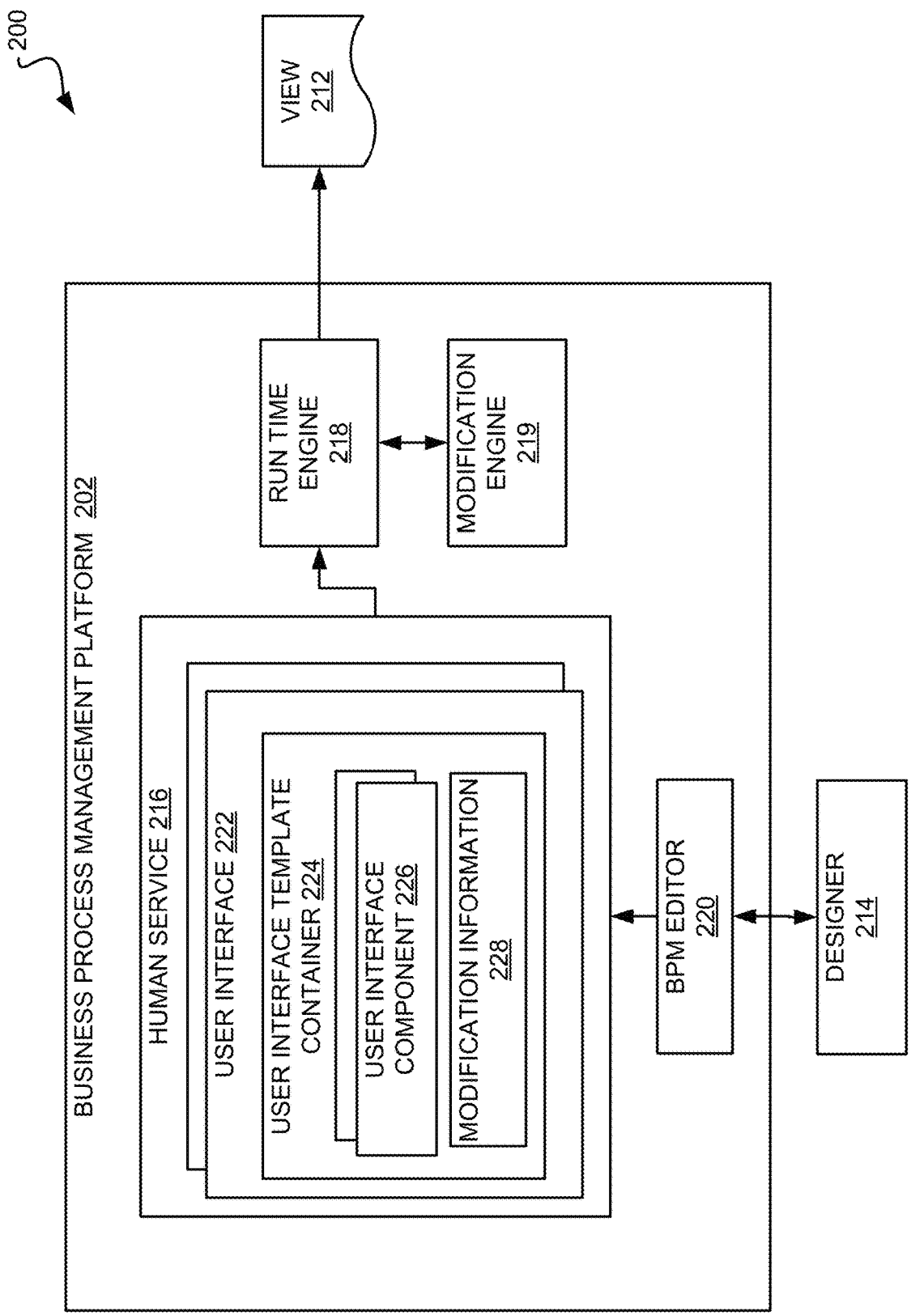
FIG. 2 illustrates a block diagram of a system for modifying a UI component, according to various embodiments.

FIG. 2 illustrates a block diagram for a system 200 of modifying a UI component, according to various embodiments. The system 200 may include a BPM platform 202. A designer 214 may be a type user of the BPM platform 202 that designs various aspects of the application 216, e.g., the user interfaces 226. The designer 214 may design the UIs to produce various views 212. The views 212 may be the visual that a user interacts with via a web browser.

The BPM platform 202 is an application that manages multiple business processes where a user interacts with the business process. The user may refer to an end-user of the BPM platform 202 and may interact with a view 212 within a web browser. For example, a user may execute a business process which concerns an aspect of the business. An example of a business process may include a sales pipeline. A human service 216 may execute one or more various business processes. For example, if the business process is a sales pipeline, then the human service 216 can be an application that tracks of various stages of the sales pipeline from lead generation to closing a sale.

In various embodiments, the designer 214 may create user interfaces 222 for the human service 216 by using a Business Process Management (BPM) editor 220. The BPM editor 220 is an application that receives a UI component that is modified by a designer. The BPM editor 220 is modified to create a UI template container 224 including original UI components 226 and modification information 228. The UI template container 224 is accessed at runtime through the run time engine 218 via a system event. In various embodiments, the BPM editor 220 is a graphical editor that receives input from a designer on the original user interfaces 222 to modify. The BPM editor may also be referred to as a BPM process designer such as that found on the IBM® Business Process Manager software suite. In various embodiments, the BPM editor 220 can be a "What you see is what you get" (WYSIWYG) editor.

A custom UI may be a type of a UI 222 and differentiated because a custom UI may be created by a designer 214 within the BPM platform 202 (e.g., using the BPM editor 220). The custom UI can be custom due to the presence of one or more modifiable UI components 226. The BPM platform 202 can be configured to work with UI components 222 that were not created by the BPM editor 220 as well as custom UI components 226 that were created by the designer 214.

In various embodiments, UIs 222 may not exist as a distinct library artifact in a Process Center. The library artifact that wraps UIs 222 is called a human service 216. Human services 216 are the server-side components that manage the presentation of UIs 222. In essence, human service 216 are applications that users use to interact with business processes. Human services 216 can be used to implement activities of a business process, or to implement stand-alone applications that can be invoked independently.

Each human service 216 can contain one or more UIs 222. The Human service 216 defines the flow between UIs 222, and defines the integrations and messages that are invoked to support the actions that the user initiates with the UIs 222. When implementing a business process activity, a human service 216 is initialized with data from the process when the process flow reaches the activity. This allows the designer 214 to build user interfaces within the context of a specific activity of a business process.

A UI from the UIs 222 may include a UI template container 224. The UI template container 224 is a logical construct that wraps the one or more UI components 226 as well as various modification information 228 for the UI component 226 configuration.

The UI component 226 is a reusable user interface building block that designers 214 use to compose a UI 224. Some examples of UI components 226 include components that allow users to edit text, push buttons, select items from a list, and select check boxes and radio buttons. Other UI components 226 are used to define the physical layout of a UI 224. Examples of layout components include vertical and horizontal sections, tables, and tab controls. Each UI component 226 is tailored to present specific information to the user, and UI components 226 also empower users to gather and manipulate specific information. In various embodiments, the UI component 226 may be an original UI component. Once the UI template container 224 is accessed by the run time engine, the modification engine 319 may modify the original UI component using the modification information 228 to produce a modified UI component.

When added to a UI 222, the designer 214 configures the UI component 226 by binding it to the business data that the component will display and to any configuration data that is necessary to control the appearance and behavior of the component at run time via the run time engine 218.

The UI components 226 can respond when any of the data that a UI component 226 is bound to changes. Designers 214 may create dynamic user interfaces 222 by binding multiple UI components 226 to the same data. When a user manipulates one UI component 226 at run time, the other UI components 226 that are bound to the same data can exhibit similar characteristics. For example, shared data involving content of a pop-up display (a first UI component) may be modified by the modification information. A graph (a second UI component) that uses the shared data can change based on the modifications to the pop-up display.

UI components 226 can also be bound to Ajax services that are invoked to retrieve information and update systems that are related to the business processes. This ability to bind to Ajax services allows designers 214 to create highly dynamic components, such as components with fields that are updated while users are typing. This feature can be also used to create UI components 226 that directly interact with services outside of the BPM.

The UI template container 224 allows for a UI component 226 to be called in a modified or unmodified state. For example, the UI component 226 of a radio button within a user interface 222 may be modified to include Javascript® code that changes the behavior of a mouseover event. The modification information 228 of the UI component 226 within the UI template container 224 may be called by the modification engine 219 to influence the behavior at the run time engine 218. The run time engine 218 may create a view 212 for a browser from the UI template container 224 with or without modifications.

Figure 3B:
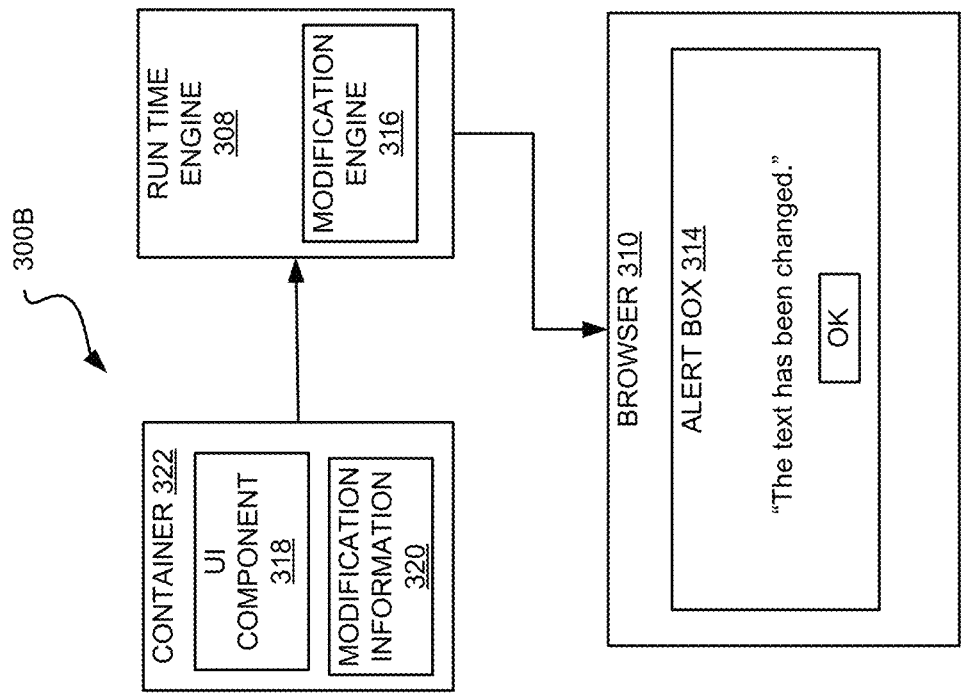
FIG. 3B illustrates a system that creates a modified alert box view from a UI component, according to various embodiments.
Figure 3A:
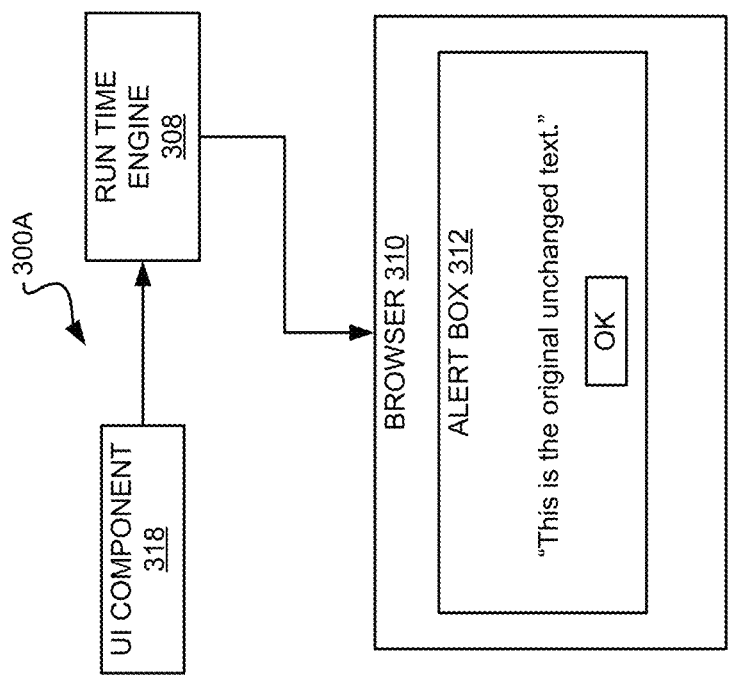
FIG. 3A illustrates a system that creates an alert box view from a UI component 318, according to various embodiments.

FIG. 3A illustrates a system 300A that creates an alert box view from a UI component 318, according to various embodiments. The system 300A may include a run time engine 308. The run time engine may read the instructions from the UI component 318 to produce a view that a user can interact through the browser 310. In the system 300A, the UI component 318 can be an alert box 312 for a user interface that alerts a user when the text of a document has been changed. The component elements for the UI component 318 may be read by the run time engine 308 to create a view that is executed by a browser 310. The browser 310 may display the alert box 312 that says, "This is the original unchanged text."

FIG. 3B illustrates a system 300B that creates a modified alert box view from a UI component 318, according to various embodiments. The system 300B may include the run time engine 308, browser 310, and UI component 318 from 300A. The system 300B may further include a container 322, which is also referred to as a UI template container. The container 322 wraps the UI component 318 and modification information 320 for the UI component.

A modification engine 316 may read the container 322 and determine how the view is modified based on the modification information 320. The modification information 320 also describes injection of code derived from the modifications to component information, and tracking of the injection of code. The modification engine 316 may include inserting the modifications to code contained in the modification information 320. For example, the modification information 320 may involve changing the alert box 312 "This is the original unchanged text" to the alert box 314 saying "The text has been changed." Once the modification engine 316 makes the changes to the code, then the run time engine 308 creates the view for the browser 310. In various embodiments, the UI component 318 is default code that cannot be modified and the modification information 320 is augmented to the user interface component. In various embodiments, augmented can also include supporting instructions for appending, deleting, changing or adding the code.

In another example, the original UI component can be an alert box 312 and be modified to transform the alert box 312 to a scrolling element within a webpage. The scrolling element would still read "This is the original unchanged text" but the format would be changed from an alert box 312 to a scrolling element using the same content data.

In various embodiments, the modification engine 316 can represent a process of the code in the UI container being executed by the BPM runtime engine 308 like any other UI component 318. By executing a load event of the UI container 322, the modification information 320 may either be injected into the page (for CSS/HTML), or code is registered to be run when an event (e.g., a mouseover) occurs on a nested UI component 318. The modification engine 316 may be optional. For example, the runtime engine 308 may lack a modification engine 316, but instead the modification information 320 and configuration data 328 are executed as part of the run time engine 308 loading the container 322. So for example, the runtime engine does not have a modification engine, but instead 320 and 328 are simply executed as part of 308 loading 322.

In various embodiments, the template container 322 reacts to a template container load event to modify the UI components 318 that are held within the container 322. The template container load event is called from a run-time element such as a webpage or application. Once called, then the template container 322 may reference the underlying component elements. For example, the modification engine 308 may be a label for the existence of code which performs a specific function. The code may execute inside of the BPM runtime 308 because the function that manages the load event and signals the invocation exists within the BPM Runtime 308. The template may include a container 322 of design time information which can vary based on each instance of the container 322, but the associated runtime part (i.e., the modification information 320) can be static. This "package" of design time information depicted in container 322, that when passed to the runtime 308, with the presence of a runtime modification engine 316 result in the final output 314.

Figure 3C:
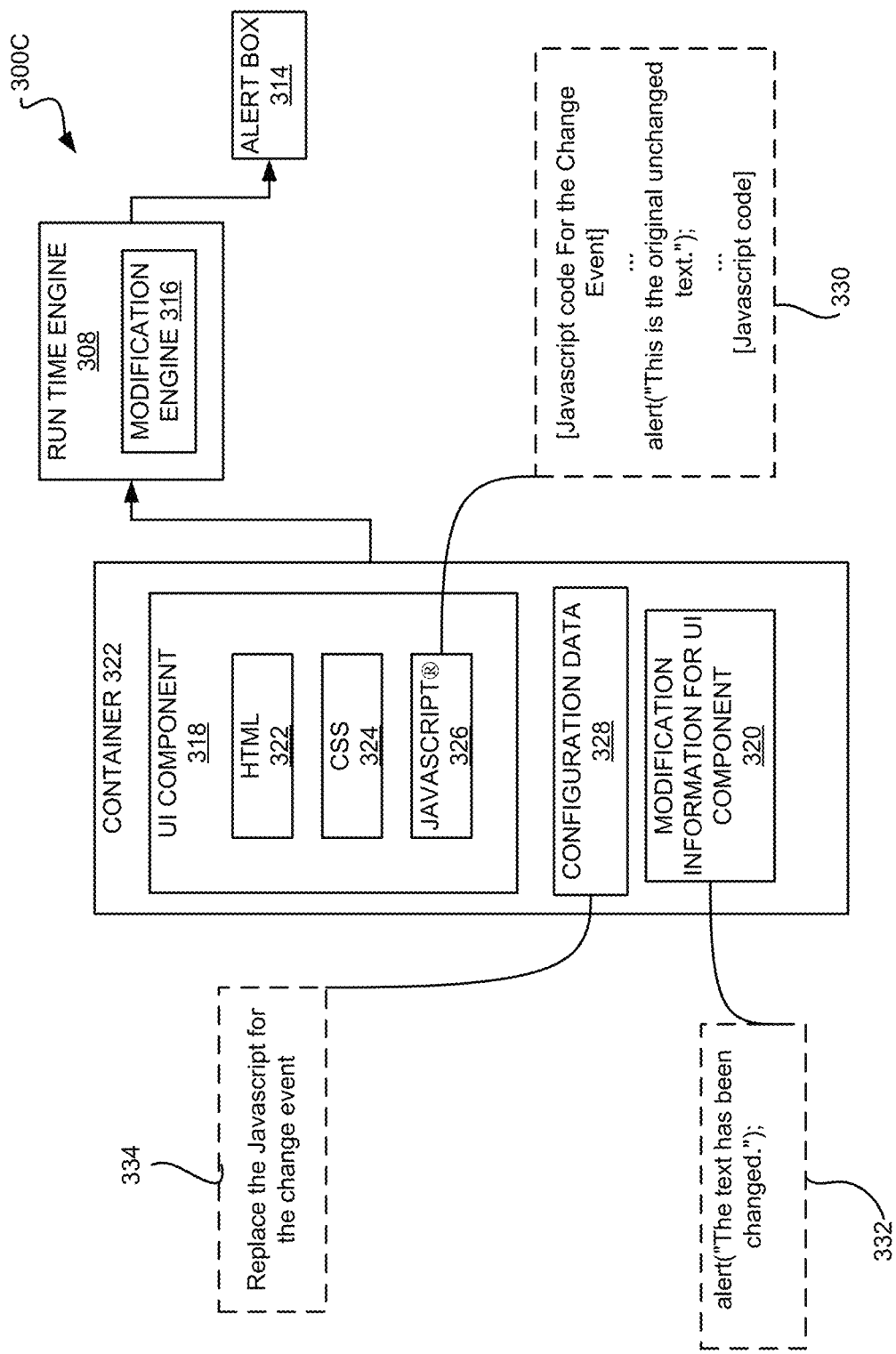
FIG. 3C illustrates a system that illustrates the various component elements in the UI component, according to various embodiments.

FIG. 3C illustrates a system 300C that illustrates the various component elements in the UI component 318, according to various embodiments. For example, the component elements in the UI component 318 can include HyperText Markup Language (HTML) 322, Cascading Style Sheets (CSS) 324, and Javascript® 326. The Javascript® 326 can include the sample Javascript® pseudo code 330. The pseudo code 330 of the Javascript® 326 may call for the alert box 314 to read "The text has been changed" when the run time engine 308 executes the UI component 318. In various embodiments, the Javascript® 326 may also include various event methods that are executed via defined events, e.g., load, view, change, collaboration, validate, unload and in-lined code. The UI component 318 may also be associated with configuration data 328 that may provide extra information to the UI component 318 to affect the UI component's display or behavior. The configuration data 328 can also be used form a complete self-contained UI component that is exposed on a BPM UI designer palette for drag-and-drop onto the BPM editor to make up a web page.

The configuration data 328 allows the modification engine 316 to properly augment the modification information 320 for the UI component 320. In various embodiments, augmenting the modification information 320 can include inserting the modification information 320 into the UI component 320. The UI component configuration data 328 is data that is interpreted by the modification engine 316. The configuration data 328 may contain a specific line or header within one of the UI component elements. The pseudo code 334 indicates that the Javascript® 326 is to be replaced by the modification engine 316 by the information contained in the modification information 320. In various embodiments, the configuration data 328 can support more than a change event. For example, the configuration data 328 can support a view event, an unload event, a collaboration event, or a validate event.

In various embodiments, the configuration data 328 can include one or more domIDs that are used to target the UI component 318 to be altered. The configuration data 328 can also include various event methods to be augmented (before or after the existing code) or replaced. The configuration data 328 may also use the name of the event method to invoke the name of the Javascript® file which contains the code or the name of a CSS file. The CSS file you want to load may contain CSS to alter the UI component as required. The HTML 322 can be altered through augmented code by manipulating the DOM.

The UI template container 322 is also designed to be configurable by the designer to be able to select and alter individual UI components, e.g., 318, on a UI, and alter the behavior of the UI component 318. The Template UI component 318 could be used to provide CSS 324 for a web page. The CSS 324 can influence a plurality of UI components on the web page beyond the UI components 318 within the UI template container 322 (e.g., by declaring a div class). The CSS 324 can also be used to provide CSS 324 specific to a particular UI component (e.g., by declaring the div id).

The modification information 320 may contain the example pseudo code 332 that calls for the alert box 314 to read "This is the original unchanged text." The modification engine 316 may read the UI component configuration data 328 which references the modification information 320. The modification engine 316 may further make modifications to the UI component 318 with the modification information 320.

Figure 4:
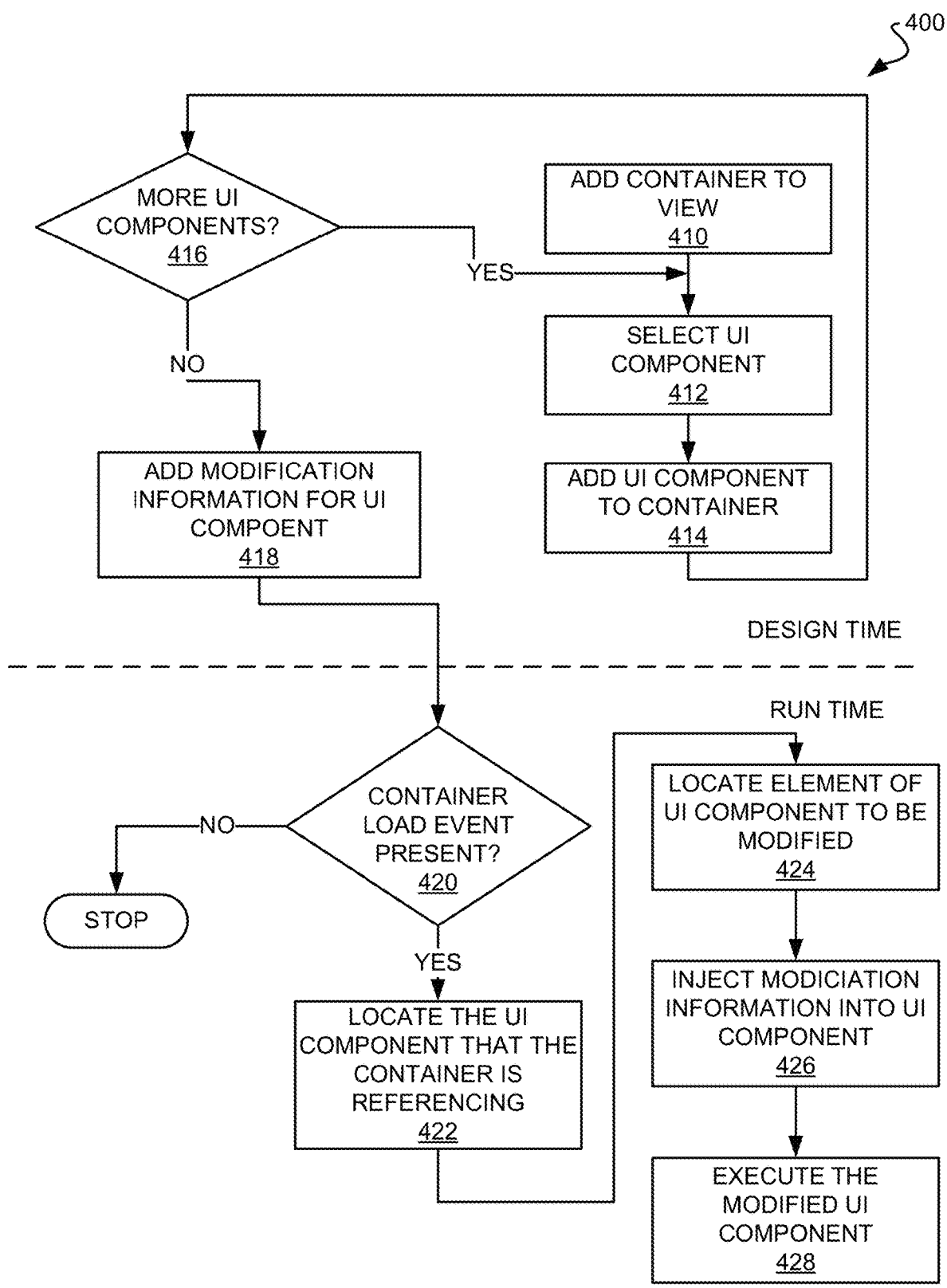
FIG. 4 illustrates a flowchart of a method for modifying a UI component, according to various embodiments.

FIG. 4 illustrates a flowchart of a method 400 for modifying a UI component, according to various embodiments. In various embodiments, operation 410 through operation 418 may occur at design time, where a designer of a UI specifies the various changes to occur. Operations 420 through 428 may occur at run time, where a user of a UI can call a modified UI component in which the run time engine calls the UI component as well as modification information that modifies the UI component.

The method 400 can begin at operation 410. In operation 410, the BPM editor is used to create, in a business process management platform, a user interface template container. The UI template container can be created by adding a UI template to a view within the BPM editor. The UI template container is logically linked to one or more user interface components of a user interface. The business process management platform allows the creation of the UI via the BPM editor. The UI may have at least one UI template container that has one or more UI components and modification information and configuration data that ties the UI component with the modification information. The modification information describes a modification to at least one component element from a user interface component from the one or more user interface components.

In operation 412, the designer may select a UI component to add to the UI template container. The designer selects the UI components to add to the UI template container by using a BPM editor to visually "drag and drop" the various UI components. In various embodiments, a dialog box may ask a designer to specify a particular event that triggers at a particular point. For example, if the event is a pop-up box that occurs when a user clicks a link, then the dialog box in the BPM editor may have a series of wizard options to indicate what the designer desires to include within the pop-up box and when the pop-up box is triggered. In various embodiments, the event may be referred to as a component element.

In operation 414, the BPM editor adds a selected user interface component to the UI template container. BPM editor can add more than one user interface component to each UI template container. Each UI component can have modifications to more than one component element within the UI component. In various embodiments, once a UI component is added to a UI template container, the BPM editor may associate the DomID of the UI component with the UI template container.

In operation 416, the BPM editor determines whether a designer desires to add more than one UI component. The UI template container can contain one or more UI components of the same or different type. Although a UI template container with one or more UI components gives flexibility in the amount of UI components that can be modified, an embodiment may involve a single UI Component per UI template container because the modification information to be injected would likely reduce complexity. Complexity may be reduced because the modification information would be applicable to that UI Component and specifically to that instance of UI Component. A UI template container with multiple, different UI components may be advantageous where on-the-fly translation for any text that the UI component encompasses is attempted and exposed in the web browser. If the designer adds more UI components, then the method 400 continues to operation 412. If not, then the method 400 continues to operation 418.

In operation 418, the BPM editor or designer can then add the modification information corresponding to a component element within the first user interface component. The UI template container can have modification information corresponding to a component element within the user interface component. Additionally, configuration data that links the modification information to the UI component may be added. For example, the configuration data may indicate the event methods (also referred to as component elements) to manipulate, where the event methods are located, and how to modify the events. Additionally, the configuration data may also describe how a manipulation engine injects code, and where the injected code originates. In various embodiments, the designer, through the BPM editor, may define a Javascript® file or CSS file that contains code to be injected, then, at runtime, the modification engine may inject the code. For example, given the DomID, the modification engine can locate all the event methods of a UI component and, since the code will be in the inline section of the UI component, event methods on the targeted UI component will not have been invoked.

In operation 420, the run time engine (e.g., the BPM runtime) invokes a container load event which triggers the modification engine. The run time engine or modification engine can determine whether a container load event is present. In various embodiments, the modification engine can represent execution path of the runtime engine executing the modification code inside the UI container.

The container load event is an event of a container being requested by the run time engine. In various embodiments, the browser may request the UI template container from the run time engine and UI component code is run from the browser. The container load event indicates that a UI template container and the corresponding UI components are requested by the browser and fulfilled by the run time engine and modification engine. The container load event includes calling the user interface template container at run time. For example, if a UI template container is called by the run time engine, then a UI component is also called. In various embodiments, a UI loading may trigger a UI template container load event. Various activities can occur at the browser. For example, a user interaction with the UI can trigger various events. In operation 422, the modification engine locates, in response to the container load event, a component element for a user interface component from the one or more user interface components in the user interface template container. The component element may also refer to an event method or a function. Examples of event methods may include a view, change, collaboration, validate, or unload event handlers. For example, in the load event handler, the load function performs initialization logic before the view loads. In the unload event handler, the unload function performs cleanup after the view has completed. The unload function is called once during the lifecycle of the view. In the view event handler, a view function performs logic such as populating the view with data before the user can see the view. In the change event handler, the change function is called when there is a change in binding or configuration data. In the collaboration event handler, the collaboration function overrides the default UI feedback behavior when multiple people work on the same view at the same time. In addition, any custom collaboration event fired during a collaboration session is delivered to the collaboration function, as the default behavior does not handle any custom collaboration events. In the validate event handler, the validate function handles validation errors that are caused by the data in the UI component.

Each UI component may have one or more component elements. The component element can be a section of code that performs a certain task, e.g., a function, or a method, subroutine, procedure, routine, or subprogram, or the component element can be a source file that a code is referencing. For example, a component element can be HTML, Javascript® for the various UI Component events, plus inline Javascript® code, CSS information, other UI Components and Javascript® libraries. The component element can also be an established library referenced by the UI component.

In various embodiments, the modification engine can search the HTML Document Object Model (DOM) from a point. There may be a symbiotic relationship between the UI template container and the UI component to be modified. The UI component element may have a particular DomID that is located through the HTML DOM.

In operation 424, the modification engine locates, at run time, modification information corresponding to the component element. The modification information contains data regarding the component element to modify. For example, the modification information may contain a configuration header that contains configuration data that maps the component element modifications to the component element.

In various embodiments, the modification engine may use a Javascript® function to find functions that represent various event handlers. Once a reference to the UI component, e.g., a DomID, is found, then the event handler function may be located. For example, a find unchange event handler can find an event handler function that performs code when an unchange event occurs. In various embodiments, the event method is an object oriented way of calling a function. The terms event method and event function may be used interchangeably. In various embodiments, operations 422 thru 426 may occur simultaneously with each other in response to a container load event.

In operation 426, the modification engine writes, at run time and responsive to the locating the modification information, the modification information into the user interface component. The modification engine can write the modification information by injecting code into the component element. For example, if the component element is an HTML document, then the modification information can include the lines of HTML to be commented out and the modified code to replace the commented out code. In various embodiments, when the UI component within the UI template container receives the load event, then the modification engine can inject the modifications (in the modification information) into the UI components within the UI template container as described within the container modification description, i.e., the configuration data, that was defined at design time.

The modification engine may inject the code after receipt of the load event for the UI component. The modification engine may be responsive to UI template container events and not events in general. When a UI template container load event occurs, then the modification information may be injected into a UI component that is being modified. The injections of code are placed in appropriate points to ensure execution at a correct time. The modification engine may turn to the configuration data to determine how to inject code as described further herein. For example, code referenced by the configuration data of the UI component can be injected such that the modified code executes before, or after the code defined in the unmodified UI component or the modified code can even replace it using standard Javascript® techniques. If DOM manipulation is required of the UI component, then the DOM manipulation can be performed via Javascript® at an appropriate point in either the load event (before, after or replace) or before the view event.

In operation 428, the run time engine can execute a modified user interface component. The modified UI component can be the UI component after the modification engine injects code. Thus, the modified UI component is based off of the UI component in the UI template container. The configuration data 328 can involve more than replacing the Javascript® for the change event. For example, the original Javascript® code may be kept and executed before or after the event code is executed. When the UI component from the container receives a load event, the changes to the UI component are then ready to be executed when the run time engine fires further events (e.g., view, change, collaboration, validate, unload, etc.). The run time engine decides when these events should be fired, but after the view event, a web page is displayed. The other events will fire based on actions performed by the user. When a BPM platform executes default code, then the UI component may also run newly injected code as well.

Referring to FIGS. 1-4. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing a user interface template container, comprising:

creating, from a user interface (UI) component selected by a designer, with a business process management (BPM) graphical editor of a BPM platform, the UI template container which is linked to one or more original UI components of a UI for the business process management platform, and which has modification information, added using the BPM graphical editor, that identifies a modification to a component element from an original user interface component from the one or more user interface components, wherein the BPM graphical editor is a "What you see is what you get" (WYSIWYG) editor that can create a UI through the use of a series of wizard options used to guide a user in the creation of the UI, wherein the BPM graphical editor is configured to define a file that contains code to be injected at runtime, the file selected from the group consisting of: a Javascript® file, and a CSS file, wherein selected UI components are used to compose a web page and wherein Document Object Model (DOM) manipulation of the selected UI components is performed by Javascript®, the selected UI component bound to Asynchronous JavaScript and XML (AJAX) services configured to retrieve information and update systems related to business processes;

determining whether a container load event is present, the container load event including calling the user interface template container and a UI component at run time, the container load event including the requesting of a user interface template container with a run time engine, wherein the template container load event is called from a run-time element selected from the group consisting of: a webpage, and an application;

locating, in response to the container load event, the component element for the original user interface component from the one or more original user interface components in the (UI) template container, wherein a UI template container is created by adding a first and a second original UI component from the one or more original UI components to the UI template container, adding the modification information corresponding to a component element within the first and the second original UI component and selecting the original UI component, and wherein the original UI component is default code that cannot be modified, and wherein the UI template container also includes modification information that identifies injection of code derived from the modification to component information and tracking of the injection of code;

locating, at run time, modification information corresponding to the component element;

writing, by injecting code into the component element that is an HTML document at run time and responsive to the locating the modification information, the modification information into a modified user interface component located within the user interface template container;

defining a file that contains code to be injected at runtime, wherein the file is selected from the group consisting of: a Javascript® file, and a CSS file;

executing the modified user interface component that is generated from the original user interface component and the modification information, the modified UI component including injected code; and locating a component element for a UI component event handler by searching for a Document Object Model Identifier (DomID) that is located through a Hypertext Markup Language (HTML) Document Object Model (DOM).

\* \* \* \* \*